United States Patent [19]

Sprenkle

[11] 4,236,303

[45] Dec. 2, 1980

[54] WIRE UNWRAP ASSEMBLY FOR USE ON AUTOMATIC WIRING MACHINES

[75] Inventor: George J. Sprenkle, Phoenixville, Pa.

[73] Assignee: Burroughs Corporation, Detroit, Mich.

[21] Appl. No.: 54,271

[22] Filed: Jul. 2, 1979

[51] Int. Cl.[3] ........................ B21F 21/00; B23P 19/04

[52] U.S. Cl. ........................................ 29/762; 140/123

[58] Field of Search ....................... 29/764, 762, 426.5; 140/123, 124

[56] References Cited

U.S. PATENT DOCUMENTS

| | | | |
|---|---|---|---|
| 3,019,517 | 2/1962 | Lovecky | 29/764 X |
| 3,095,640 | 7/1963 | Butterworth et al. | 29/764 X |
| 3,524,482 | 8/1970 | Church et al. | 29/762 X |
| 3,971,419 | 7/1976 | Sprenkle | 140/124 X |

*Primary Examiner*—Carl E. Hall

*Attorney, Agent, or Firm*—Francis A. Varallo; Leonard C. Brenner; Kevin R. Peterson

[57] ABSTRACT

The present disclosure describes an unwrap assembly for use on automatic wiring machines. Such machines are employed to make solderless wire-wrapped connections on posts or terminals emanating from the common plane surface of logic cards and the like. For various reasons, such as logic changes or faulty workmanship, the complete or partial removal of the wires wrapped by such machines may be required. The unwrap assembly of the present invention, comprised of a specially designed unwrap tool slidably disposed within a wire coil stripper sleeve and readily mounted between brackets on the wiring machine, performs the removal function in an economical, time-saving and efficient manner.

9 Claims, 10 Drawing Figures

WIRE UNWRAP ASSEMBLY FOR USE ON AUTOMATIC WIRING MACHINES

BACKGROUND OF THE INVENTION

Machines for automatically attaching interconnecting wiring to terminals arranged on a card or panel by means of solderless wrapped connections are well known in the electronics field. The Automatic WIRE-WRAP Machine, Model 14FV, manufactured by the Gardner-Denver Company of Grand Haven, Michigan is an example of such a machine. In general, the machine consists of movable carriages containing wrapping tool assemblies and dressing fingers that are positioned to form a desired wire pattern. The automatic operation of the machine is achieved through the use of a reader which decodes the input data from a storage medium. The function of the input data is to translate the output of a computer program into the mechanical motions required of the machine to perform the wiring task.

In an actual production cycle, utility type logic card assemblies containing approximately 1100 wires distributed on two levels of a 2300 wrap post field are wired by the aforementioned type machine. Changes in the logic design, poor workmanship or other conditions often require the removal of all or part of the wiring on such cards and the rewiring thereof. Present methods, employed to accomplish the task of removing all of the wires on a utility card of the size mentioned above, may require from eight to twelve hours labor. Such present methods entail the manual unwinding of the wires from the posts by using an unwrapping tool turned by hand. Alternatively, the removal may be accomplished by using a semi-automatic wiring machine which is program-controlled to position a wrap post in line with an air operated wrap gun equipped with an unwrap tool. The tool is moved onto the selected post by the machine operator, who must also determine the necessary rotation, either clockwise or counter-clockwise, for unwrapping that particular wire wrap. Besides the labor and time required to remove the large number of wraps, an additional operation is required to reposition the field of wrap post tips to within the tolerance needed for efficient rewrapping on automatic machines. Moreover the possibility exists for irreversible damage to a wrap post during the wire removal, thereby requiring the replacement thereof—a time-consuming procedure which entails unsoldering the damaged post and soldering the new post in its place.

The unwrap assembly of the present invention is adapted to be readily installed on the automatic wiring machine which provided the initial wire wraps. In general, the machine is programmed in a sequence opposite to that of the wire installation sequence, such that desired wires are removed in an efficient manner without damage to the wrap posts.

SUMMARY OF THE INVENTION

In accordance with the present invention, an unwrap assembly is provided for use in an automatic wiring machine. An actual operative embodiment of the assembly has been successfully used on a Gardner-Denver, Model 14FV machine. The mounting of the new unwrap assembly on the machine is readily accomplished since it replaces the wrap tool and associated backup jaw and insulation gripper jaw which serve no purpose in the unwrap operation.

In performing its wiring function, the aforementioned machine utilizes a pair of wrap tools and associated dressing fingers, where required, to simultaneously wrap both ends of a strip of wire around respective posts or terminals emanating from the surface of a board or panel. Motors housed in the wrap tool assemblies drive the respective wrap tools in opposite directions, thereby providing clockwise and counter-clockwise wire wraps as viewed in the direction of the panel. The latter is mounted on an index table having an axis of rotation in the horizontal plane. Thus, the panel being wrapped may be rotationally indexed to four positions at 90 degree spacings.

In utilizing the automatic wiring machine to remove unwanted wire wraps, unwrap tools in acordance with the present invention, opposite in nature to the wrap tools, replace the latter in the wrap tool assemblies.

Briefly, each unwrap tool is comprised of a generally cylindrical holder having an aperture for receiving the rearward extremity of a tip. The forward extremity of the latter has a bore sufficient to receive the post having a wire to be unwrapped. A coplanar tooth-like member having an angled leading surface projects from the forward tip extremity. Finally, the tip is partially enclosed within a tubular sleeve which has an opening or slot in a side wall thereof extending from its forward extremity, rearwardly to a point at which the leading surface of the tooth-like member of the tip is exposed. The last mentioned surface is positioned adjacent one of the longitudinal walls which define the slot in the tool sleeve, and lies in proximity to a tapered groove disposed in the sleeve at that location. The sleeve also includes a circumferential collar at its forward extremity.

During the unwrap operation, input data is supplied to the machine so that the pair of unwrap tools are properly positioned over each pair of posts which are to have their wire wraps removed. Obviously, such input data is similar to that for the initial wiring procedure, except that the instructions to the machine are reversed. For example, when all of the wires must be removed, the last wired pair of posts are the first to be unwrapped.

It has been assumed in the foregoing, that the wiring instruction program is available and that the reverse instructions needed for unwrapping the wires may be derived therefrom. However, at some expense in efficiency, a wired panel whose wiring program is unknown, may be completely unwrapped by a universal program for the automatic machine which provides that the wire wrapping on each post is subjected in turn to both unwrapping tools. If the rotation of the unwrap tool disposed over a post is opposite to that of the wiring bit which installed the wrap, the wire will be removed. On the other hand, if the rotation of the unwrap tool is the same as that of the wiring tool, the wrap will be undisturbed, and will be removed in the next cycle by the opposite unwrap tool.

During unwrapping, the position of the index table on which the panel is mounted may remain the same as during the wiring cycle and the rotation of the respective motors in the wire wrap assemblies, reversed. Alternatively, the index table may be rotated 180 degrees from its wiring position, thereby permitting the rotation of the motors to remain unchanged.

In accordance with the design of the unwrap tool, the tooth-like member of the tip initiates the unwrapping of the uppermost wire turn on the post, permitting the wire to be guided by the tapered groove in the sleeve while forming at least a turn of a new coil around the sleeve to the rear of its circumferential collar. The unwrap tool is then withdrawn from the post with the wire clinging to the sleeve, and the wire is subsequently pushed off the sleeve by a stripper sleeve member during the return of the tool to its retracted position.

The benefits accruing from the present invention include the following. The card may be stripped in the same or lesser amount of time than that required to wire initially. For example, since dressing finger data is not required during unwrapping, the associated machine movements are not required, thereby enhancing the machine speed. The post damage often resulting from hand-stripping operations is eliminated. Concomitant with the latter, wrap post tip repositioning is eliminated, since unwrapping in the automatic mode tends to enhance the true tip position required for subsequent automatic rewiring.

Other features and advantages of the present invention will become apparent in the detailed description appearing hereinafter.

DESCRIPTION OF THE PREFERRED EMBODIMENT

Before proceeding with a description of the present invention as it effects the unwrapping of previously wrapped wires, it is believed helpful to review briefly the portions of a typical wire wrapping machine and to describe in simplified fashion the wiring operation performed thereby. Therefore, the Gardner-Denver machine, Model 14FV has been chosen for purposes of example and a partial front view thereof appears in FIG. 1. It should be understood, however, that the invention should not be considered limited to use with this machine.

Figure 1:
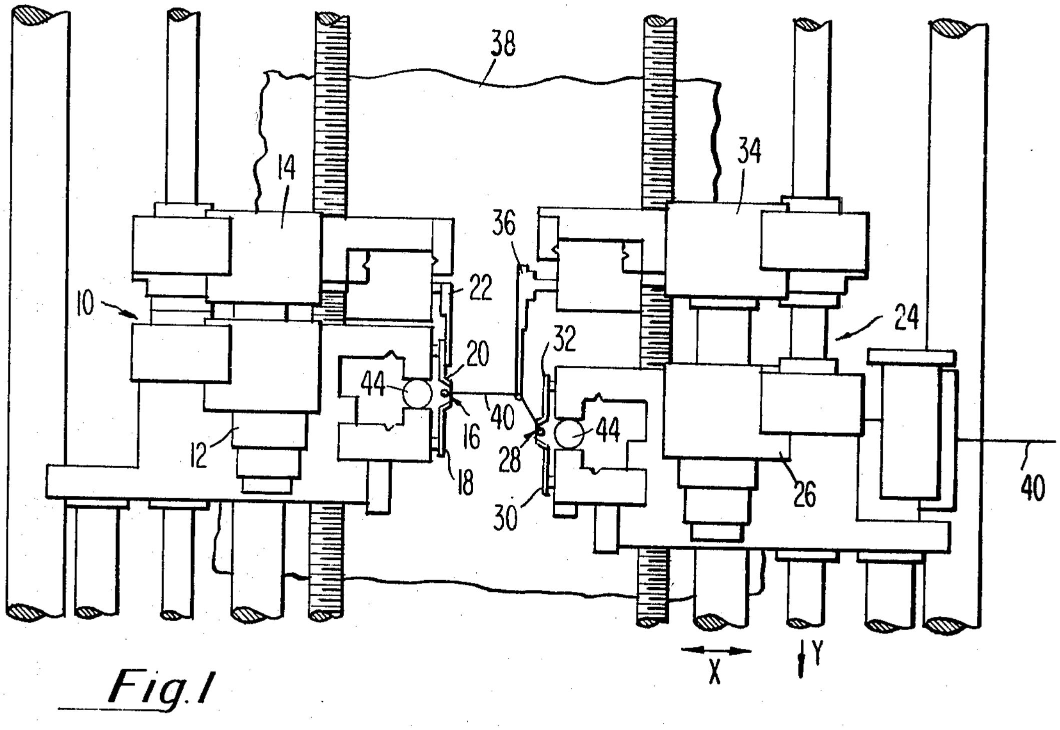
FIG. 1 is a partial front view of the aforementioned Gardner-Denver machine.

With reference to FIG. 1, there are depicted two sets of carriages, a left hand set 10 comprising a wrap tool carriage 12 and a dressing finger carriage 14. The former carriage includes a wrap tool or bit 16, and an insulation gripper jaw 18 which cooperates with a backup jaw 20. The latter carriage bears a dressing finger 22. The right hand set of carriages 24 includes a wrap tool carriage 26 having a wrap tool 28, insulation gripper jaw 30 and backup jaw 32; and a dressing finger carriage 34 with dressing finger 36. Both the sets of carriages 10 and 24 as well as the terminal panel 38 are oriented in vertical planes.

Following is a simplified outline of carriage movements during a wiring operation. At the start of a wire pattern, the left hand carriages 10 and the right hand carriages 24 are grouped. This is accomplished by drive means (not shown) which are capable of moving the left hand set of carriages 10 toward the right hand set 24 along the X axis as indicated by the double-headed arrow. Wire 40 is fed into the left hand wrapping tool carriage 12 via the wire feed mechanism located in the right hand tool carriage 26. The uninsulated end of the wire is gripped by the bare wire gripper assembly (not shown) which is positioned adjacent the backup jaw 20. At this time, the insulation gripper jaw 18 and the backup jaw 20 close. The former holds the leading end of the insulated portion of the wire 40 against the "open" wrap tool bit 16, that is, extending from the sleeve. The latter jaw 20 bears against the wrap tool 16 to provide a backup support so that the tool will not be deflected by the tension in the wire pattern or from the force of the insulation gripper jaw 18 when it holds the insulated portion of the wire against the tool. The backup jaw 32 in the right hand carriage 26 is also closed against the "open" bit 28 at this time.

Next, additional X drive means (not shown) position the "locked-up" or coupled left and right sets of carriages 10 and 24 to a predetermined X axis location. At this point the sets of carriages are uncoupled and the right hand set of carriages 24 is locked in this last position.

If both dressing fingers 22 and 36 are to be used, the finger 36 in the right hand dressing finger carriage 34 is lowered ahead of the wire 40 and is locked at that position while the tool carriage 26 proceeds in a descending motion along the Y axis, as indicated by the arrow, to its proper location. This motion forms the wire around the dressing finger 36. The reason for locking the dressing finger at the desired location is that the dressing finger carriage 34 is not at any time physically connected to its associated wrap tool carriage 26 but makes contact therewith by gravitational force.

When this action has been completed, the left hand set of carriages 10 is moved to a predetermined X axis location by the aforementioned "additional X drive means". Then the left hand carriages 10 proceed, as required, through a sequence similar to that described for the right hand carriages 24 to position the dressing finger 22 and wrap tool 16. In FIG. 1, the last operation is not required to form the illustrated wire pattern, since only the right hand dressing finger 36 is utilized.

At this time the right hand insulation gripper jaw 30 closes and the left hand bare wire gripper assembly releases its hold on the leading end of the wire 40. A "bits close" movement is then performed by the machine wherein the wrap tools 16 and 28 are withdrawn into their respective sleeves. The right hand insulation gripper jaw 30 and its associated backup jaw 32 hold the trailing end of the wire against the wrapping bit 28 during the "bits close" movement. The movement causes the leading and trailing ends of the wire 40 to be drawn into the sleeves of the respective wrapping bits 16 and 28 in preparation for wrapping. Both sets of insulation gripper jaws 18, 30 and backup jaws 20, 32 are then opened.

At this point in the cycle, the wire pattern has been formed in space above the posts (not shown in FIG. 1) to be wrapped. Upon instruction of the machine program, the wrapping tool bits and dressing fingers are lowered a prescribed distance over the posts on the panel and connections are made simultaneously to the two posts under the respective wrap tools 16 and 28. When the wrapping has been completed, the tools and dressing fingers are retracted clear of the posts. The left and right hand sets of carriages 10 and 24 are then regrouped as described above to begin the next wire pattern cycle.

Figure 2:
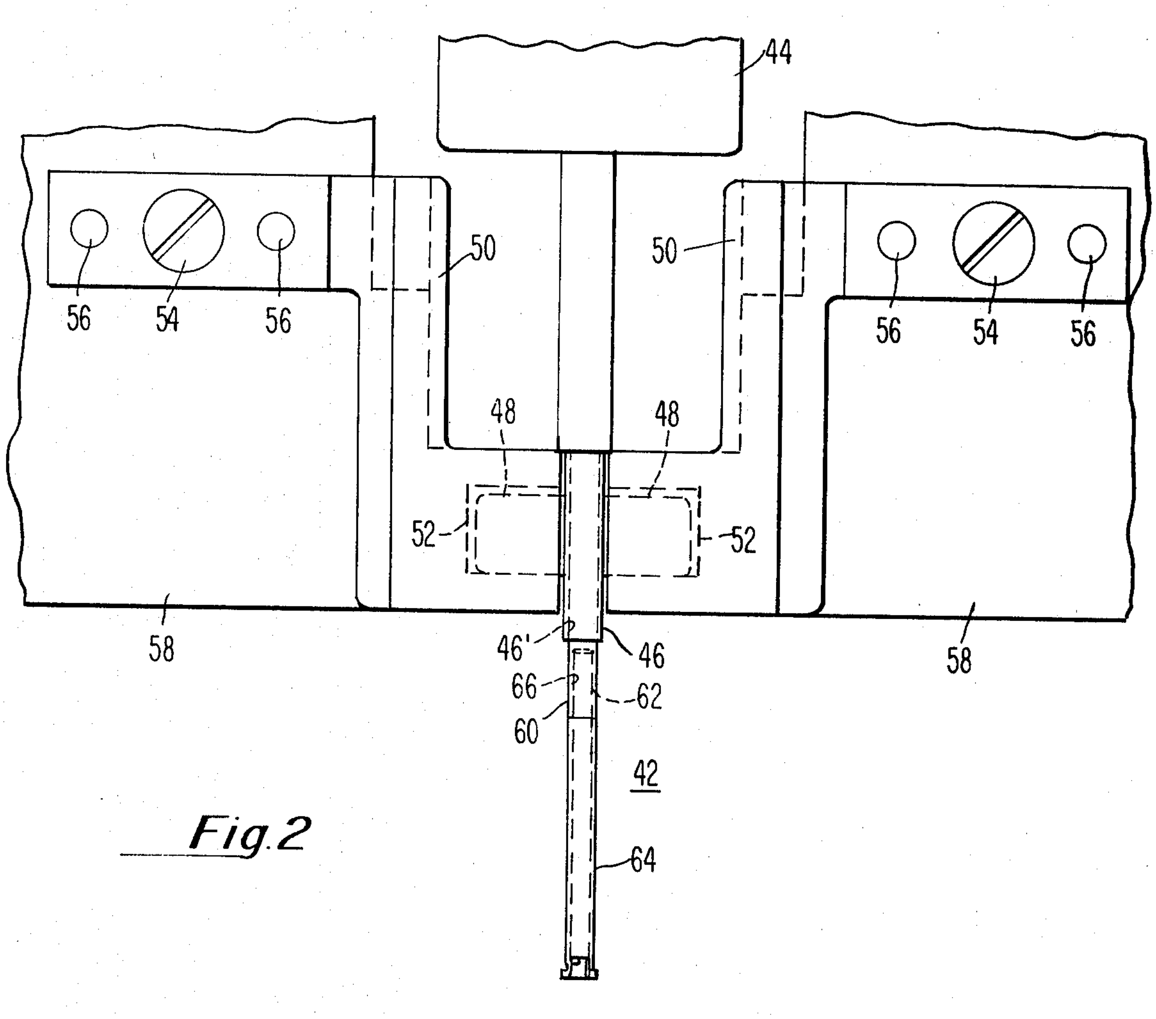
FIG. 2 is a side view of the unwrap assembly of the present invention.
Figure 3:
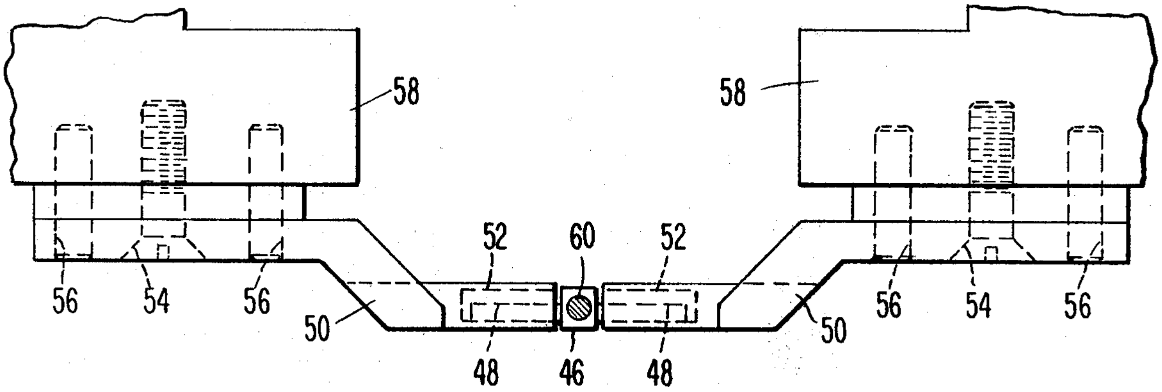
FIG. 3 is a front view of the unwrap assembly.

FIGS. 2 and 3 are respective side and front views of the unwrap assembly of the present invention. The assembly comprises an unwrap tool or bit 42 having its rearward extremity coupled to the machine "wrap-tool assembly" 44. The latter provides for the rotation of the tool, and its extension and retraction relative to the post being unwrapped. The unwrap tool 42 is slidably mounted within the bore 46' of a stripper sleeve 46 designed to remove the coil of wire clinging to the tool after it has been released from the post. This action is described hereinafter. The stripper sleeve is generally rectangular in form and has relatively thin coplanar extensions 48 projecting from opposite sides thereof. The stripper sleeve 46 is in turn supported between a pair of allochirally shaped and juxtaposed brackets 50 having respective homologous apertures 52 of elongated cross-section. The extensions 48 of the stripper sleeve 46 are loosely disposed within the last mentioned apertures so that they may move freely therein. The brackets 50 themselves are mounted by screws 54 and guide pins 56, respectively on the pivot arms 58 of the automatic machine to which the insulation gripper jaw, for example, 18 and the backup jaw, such as, 20 of FIG. 1, are normally affixed. Movements of the pivot arms 58 (and associated brackets 50) in directions transverse to the longitudinal axis of the unwrap tool 42, as required in the opening and closing action of the jaws which they have replaced, are permitted by the stripper sleeve extensions 48 within the bracket apertures 52. It should be observed, however, that such movements of the brackets 50 have no effect on the unwrap operation being performed.

Figure 4:
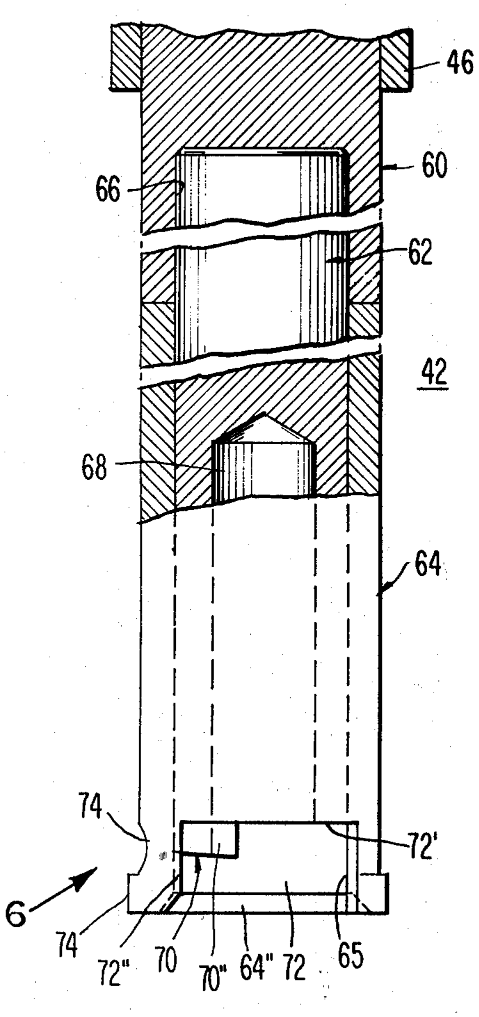
FIG. 4 is an enlarged view of the unwrap tool of the assembly of FIG. 2.
Figure 5:
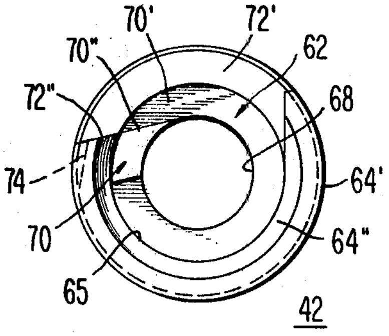
FIG. 5 is an end view of the forward extremity of the unwrap tool of FIG. 4.
Figure 6:
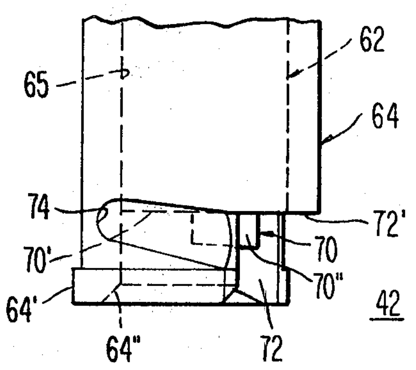
FIG. 6 is a view of the unwrap tool as seen in the direction of the arrow "6" in FIG. 4.

FIG. 4 is an enlarged partial view of the unwrap tool 42, while FIG. 5 is an end view of the forward extremity thereof. With general reference to FIGS. 2 and 3 and specific reference to FIGS. 4 and 5, the unwrap tool 42 is a unitary structure comprised of a tool holder 60, a tip 62 and a tool sleeve 64. The generally cylindrical holder 60 has a forward extremity with an aperture 66 for receiving the aforementioned tip 62. The latter is a cylindrical member having a solid rearward section which is press-fitted into the tool holder aperture 66 and a tubular forward section with a bore 68 of sufficient diameter to accommodate the cross-sectional dimensions of the post having a wire to be unwrapped. The tip 62 also includes a tang or tooth-like member 70 projecting from the circumference 70' of the tip forward section. The tooth-like member is further formed with an angled leading surface 70'' (FIG. 5) somewhat resembling a knife edge. The tip 62 is partially enclosed within a tubular sleeve 64 which is press-fitted over the tip, such that the inner surface of the tool sleeve 64 is contiguous with the outer surface of the tip 62. The forward extremity of the tubular tool sleeve 64 extends beyond the tip 62, providing a counterbore 65 of sufficient diameter to accommodate the post with the turns of the bare wire wrapped thereon. Moreover, the sleeve 64 contains a generally rectangular opening or slot 72 in a side wall extending from its forward extremity, rearwardly to a point at which the aforementioned leading surface 70'' of the tooth-like member 70 of the tip 62 is exposed. As seen in FIG. 5, the transverse surface 72' defining the bottom of the slot 72 is flush with the circumferential surface 70' of the tip 62. With reference to FIG. 6, which is a view of the tool forward extremity in the direction of the arrow "6" in FIG. 4, the tooth-leading surface 70'' is positioned adjacent one of the longitudinal walls 72'' which define the slot 72 and lies in proximity to a tapered groove 74 disposed in the sleeve at that location. The tool sleeve 64 is also formed with a circumferential collar 64' at its forward extremity, and a chamfered inner edge 64''.

The unwrap operation performed by the present invention is illustrated pictorially in FIGS. 7 through 10.

Figure 7:
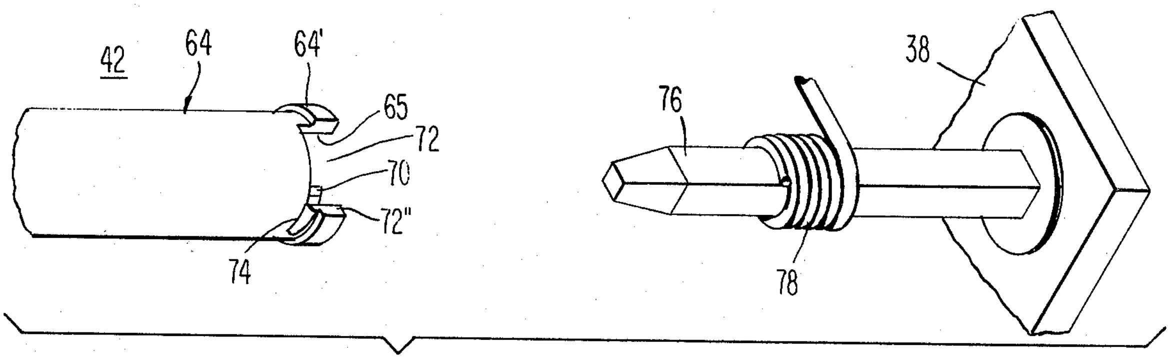
FIG. 7 is a pictorial illustration depicting the initial relationship of the unwrap tool of the present invention with the post to be unwrapped.

In FIG. 7, a post 76 is shown mounted on a panel 38 and has a wire coil 78 wrapped thereon. As viewed in the direction of the panel 38, the wire coil 78 was formed by a wrap tool, for example, 16 in FIG. 1, rotating in a clockwise direction and consists of at least one initial turn of insulated wire and several succeeding turns of bare conductor. The unwrap tool 42 is shown in axial alignment with the post 76 but withdrawn therefrom prior to the unwrap operation.

Figure 8:
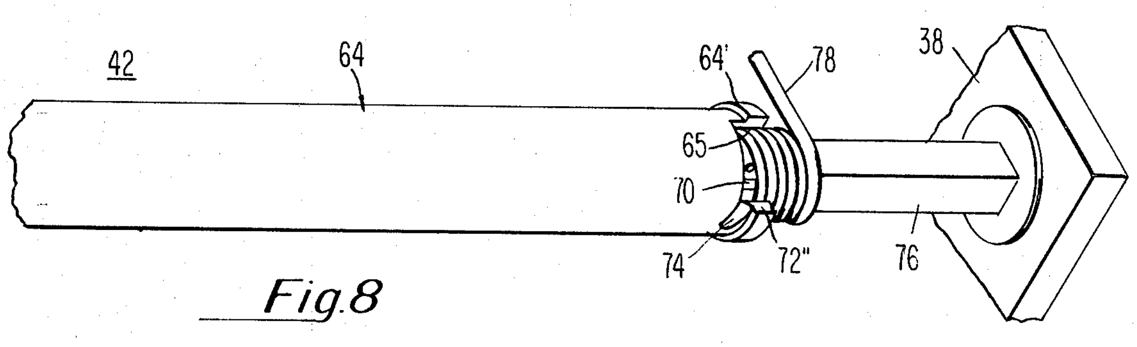
FIG. 8 further illustrates the extension of the unwrap tool over the post, just prior to the commencement of removal of the wire coil.

FIG. 8 shows the extension of the unwrap tool 42 over the post 76, the end of the post entering the respective concentric bores 68 and 65 of the tip and tool sleeve. The bore 65 of the latter is of sufficient diameter to accommodate the combined tip cross-section and the uninsulated turns of wire thereon. The tooth-like member 70 of the tip 62 is depicted in proximity to the end of the wire coil 78 and has its leading angled surface 70'' oriented such that with a counterclockwise rotation of the unwrap tool, as shown by the arrow, it will engage the underside of the first turn of the coil and lift it away from the post 76. The end of the wire coil is then directed along the groove 74 in the tool sleeve 64.

Figure 9:
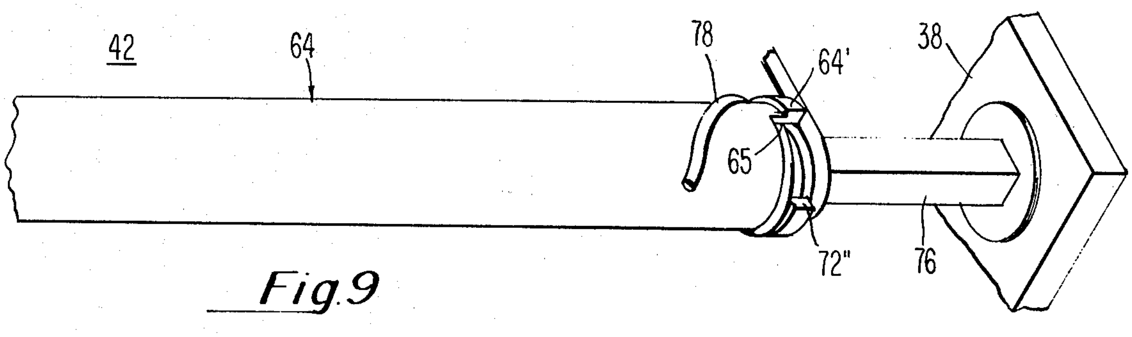
FIG. 9 illustrates the unwinding of the wire coil from the post.
Figure 10:
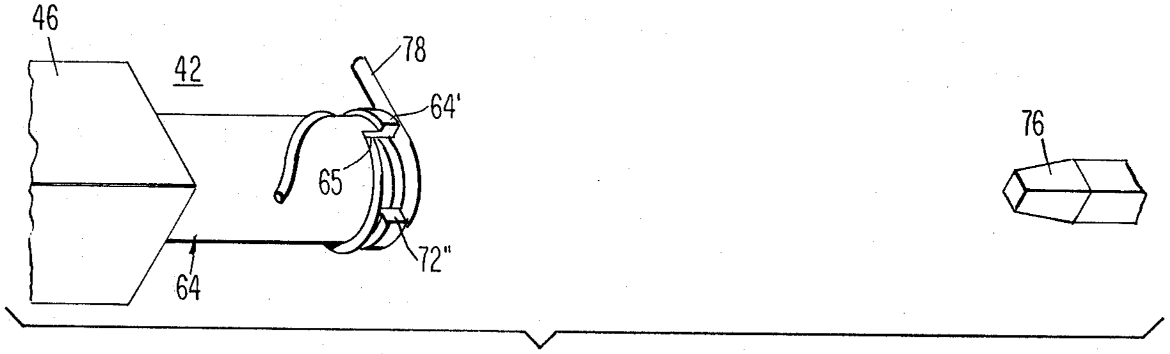
FIG. 10 depicts the retraction of the unwrap tool from the post with a newly formed coil clinging to the tool extremity.

In FIG. 9, the continued rotation of the unwrap tool 42 causes the wire to be uncoiled from the post, the removal of each turn causing a loosening of the remaining turns of the coil 78. Simultaneously, a new coil comprised of at least a turn of wire is formed on the outside of the tool sleeve 64. When the original coil has been sufficiently loosened from post 76, the unwrap tool 42 is retracted from the post, carrying the coil with it, as seen in FIG. 10. The collar 64' on tool sleeve 64 serves to prevent the coil from slipping off the tool sleeve 64 during this operation. As the unwrap tool 42 is further retracted and slides through the bore 46' in the stripper sleeve 46, the latter contacts the coil and pushes it off the tool sleeve.

As noted hereinbefore, a typical wiring operation with an automatic machine involves the simultaneous wrapping of both ends of a strip of wire by wrap tools which rotate in opposite directions. Similarly, although for simplicity a single unwrap tool has been shown in FIGS. 7–10 inclusive, it should be understood that a pair of unwrap tools, rotating respectively in directions opposite to the tools which formed the wraps, may be efficiently utilized. With reference to FIG. 9, if the wire coil 73 on post 76 had been formed by a wrap tool rotating in a counterclockwise direction, as viewed toward the panel, an unwrap tool rotating in a clockwise direction would be required. Additionally, to engage the end of the last turn of wire placed on the post 76, the tooth-like member 70 with its angled leading surface 70″ would be positioned on the opposite side of slot 72 in the tool sleeve 64. Likewise, the groove 74 in the tool sleeve surface would be relocated to the opposite side of the sleeve.

In conclusion, it is submitted that the unwrap assembly of the present invention offers a convenient, economical, time-saving means of renovating previously wired logic panels. It should be noted that although the previous description outlines a specific design for a particular machine, the basic principles taught herein may be applied to other similar automatic machines which nevertheless differ somewhat in construction or operation. Accordingly, changes and modifications of the components of the unwrap assembly may be needed to suit particular requirements. Such variations as are within the skill of the designer, and which do not depart from the true scope and spirit of the invention are intended to be covered by the following claims.

What is claimed is:

1. A wire unwrap assembly for use on an automatic wiring machine for unwrapping a wire coil from a post, which includes an unwrap tool comprising:

a tool holder having an aperture at one extremity thereof, a tip having one of its extremities rigidly fixed within the tool holder aperture and having a bore of predetermined depth terminating at its other extremity, said tip including a coplanar tooth-like member projecting from the surface of the last mentioned extremity, a tool sleeve for partially enclosing said tip, the inner surface of said tool sleeve being contiguous with the outer surface of said tip, one extremity of said sleeve extending beyond said tip and providing a counterbore, said sleeve having a slot in a side wall thereof, said slot extending from the outermost surface of said one extremity of said sleeve to the point at which said tooth-like member of said tip is exposed within said slot, said tooth-like member being disposed adjacent a preselected one of the longitudinal walls which define said slot, said sleeve further including a generally transverse-oriented tapered groove in its surface in proximity to said tooth-like member.

2. A wire unwrap assembly as defined in claim 1 characterized in that said tooth-like member includes an angled leading surface adapted to engage the end of the first turn of said wire coil during the rotation of said unwrap tool in a direction opposite to that in which said wire coil was initially wound.

3. A wire unwrap assembly as defined in claim 2 wherein said bore of said tip has a diameter sufficient to receive said post and said counterbore of said tool sleeve has a diameter to receive the portion of said post wrapped with said wire coil.

4. A wire unwrap assembly as defined in claim 3 further characterized in that said tool holder and said tip are of generally cylindrical geometry and said tool sleeve is tubular, said slot in said tool sleeve being generally rectangular.

5. A wire unwrap assembly as defined in claim 4 further characterized in that the circumferential surface of said tip from which said tooth-like member projects is flush with the transverse circumferential surface defining the bottom of said slot in said tool sleeve.

6. A wire unwrap assembly as defined in claim 5 wherein said sleeve is formed with a circumferential collar at said one extremity to retain the wire disposed around said tool sleeve during the unwrap operation as the unwrap tool is retracted from said post.

7. A wire unwrap assembly as defined in claim 6 further characterized in that the inner edge of said tool sleeve leading into said counterbore is chamfered to facilitate the entrance of the post and wire coil therein.

8. A wire unwrap assembly as defined in claim 7 further including a stripper sleeve having a bore for slidably accommodating said unwrap tool, the retraction of said unwrap tool after the removal of said wire coil from said post causing said stripper sleeve to contact and push the newly formed wire coil from the outer surface of said tool sleeve.

9. A wire unwrap assembly as defined in claim 8 further characterized in that said stripper sleeve has a pair of coplanar extensions projecting from opposite sides thereof, a pair of allochirally shaped and juxtaposed brackets mounted on said machine, said brackets having respective homologous apertures of elongated cross-section for receiving respective ones of said pair of coplanar extensions, said last mentioned extensions being loosely disposed in said elongated apertures to permit them to move freely therein.

* * * * *